United States Patent [19]
Moreau

[11] Patent Number: 5,690,522
[45] Date of Patent: Nov. 25, 1997

[54] CABLE TIE FLOTATION DEVICE WITH CABLE TIE

[76] Inventor: Reginald J. Moreau, 70 William Gannon Rd., Manchester, N.H. 03104

[21] Appl. No.: 678,519

[22] Filed: Jul. 9, 1996

[51] Int. Cl.⁶ .................................................. B63B 22/00
[52] U.S. Cl. .................................................. 441/1
[58] Field of Search .................. 441/1, 133, 134, 441/59; 24/16 PB, 30.5 P

[56] References Cited

U.S. PATENT DOCUMENTS

| | | |
|---|---|---|
| 4,009,509 | 3/1977 | McCormick . |
| 4,188,004 | 2/1980 | Fulton et al. . |
| 4,332,048 | 6/1982 | Eddy ............................................ 441/1 |
| 4,804,326 | 2/1989 | Lennon ....................................... 441/59 |
| 5,121,524 | 6/1992 | Mortensen . |
| 5,193,250 | 3/1993 | Caveney . |
| 5,193,251 | 3/1993 | Fortsch . |
| 5,330,378 | 7/1994 | Park ........................................... 441/133 |

*Primary Examiner*—Stephen Avila
*Attorney, Agent, or Firm*—Mesmer Law Offices, P.A.; Robert R. Deleault, Esq.

[57] ABSTRACT

A cable tie flotation device for making a cable tie buoyant having a volume of resilient, easily deformable material having an opening therethrough and a fastening means. The deformable material has a specific gravity less than one and is of sufficient quantity to keep the cable tie afloat in a liquid medium. The fastening means includes an opposed resilient force created by the deformation of the opening the material by a cable tie passing therethrough such that the deformable material is maintained in connective relationship about the cable tie by the opposed force of the resilient deformable material as it attempts to return to its original shape.

20 Claims, 1 Drawing Sheet

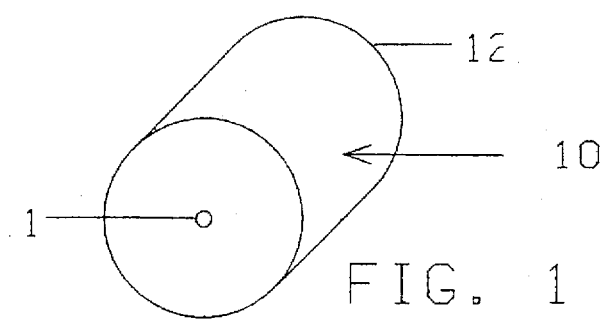
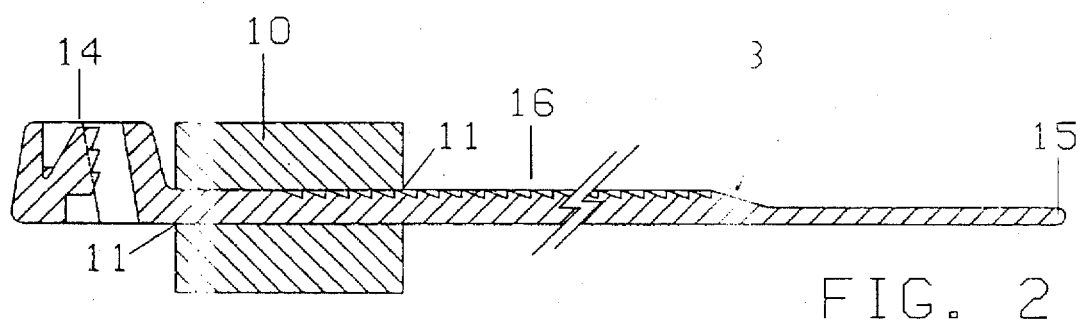
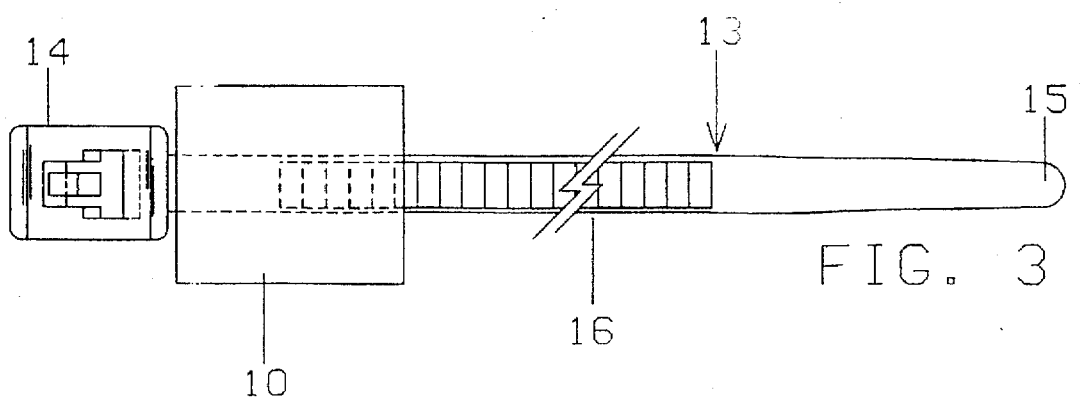

CABLE TIE FLOTATION DEVICE WITH CABLE TIE

BACKGROUND-FIELD OF INVENTION

This invention relates to binding clips, bundling straps, tie straps, etc., commonly known as cable ties, and specifically to a method of flotation of a cable tie.

BACKGROUND-DISCUSSION OF PRIOR ART

Cable ties ( i.e., illustrated in U.S. Pat. No. 4,009,509 to McCormick, 1977) are the predominate fastener used for securing cables, wires, tooling, hoses, radiation shielding, barriers, etc. that are located within a foreign material exclusion zone (FMEZ) at Nuclear Power Stations.

Within the FMEZ there are open systems and components which include the reactor cavity, refueling pool, reactor vessel, etc.. These open systems or components contain water up to 90 feet deep with intricate components beneath.

These areas maintain cleanliness by preventing any uncontrolled introduction of foreign materials by individually identifying and tagging and accounting upon entry and exit of the area. Cable ties are foreign materials.

Although cable ties are excellent fasteners they do occasionally break, snap, or become unfastened. Retrieval of these cable ties, if found, must be achieved.

Thus high strength cable ties are used which have a specific gravity greater than one and will sink when placed in water.

Once a cable tie is declared lost a search is then performed. Searches consist of visual inspections via underwater telescopes and/or remotely controlled miniature submarines (mini-subs). Once the cable tie is found the retrieval process may encompass, mini-sub with claws, long handled tooling with similar or makeshift claws, or underwater vacuums, to pick-up the cable ties.

This entire process consumes several man hours and may cost thousands of dollars. Also, being in a radiation field, it costs plant workers additional radiation exposure which is heavily regulated and scrutinized by regulatory commissions.

When the cable tie is declared lost, an engineering assessment must be performed to determine if any detrimental effects will occur if the cable tie remains in the plant systems. This assessment again takes several man hours and can cost thousands of dollars in engineering costs. These cost do not include the costs involved with delaying the power stations from coming back on line and producing electricity which could be in the hundreds of thousands of dollars.

After performing a computerized patent search no prior art for this flotation device is known. Several catalogs were reviewed for a cable tie flotation device including Newark Electronics, McMaster Carr and several cable tie manufacturers catalogs such as the Thomas & Betts and Panduit were also reviewed. Again, no prior art could be found.

Marketing of this flotation device is currently underway, with orders taken for tens of thousands of units

OBJECTS AND ADVANTAGES

Several objects and advantages of the present invention are:

(a) to provide a cable tie flotation device so that when a cable tie is introduced into water, and if said cable tie should break or become unfastened will remain buoyant.

(b) to provide a method of identification for accountability issues.

(c) to provide a highly compressible material for reduced radiation waste storage.

(d) to provide a method for high visability through different coloring (e) To provide a method of color coding (f) to provide a quick and easy way of assembling the flotationt device onto the cable tie.

(g) to provide an inexpensive way of manufacturing.

(h) to provide a flotation device that will not impede with the usefulness of the cable tie and conform to the mating parts for which the cable tie is designed to fasten.

(i) to provide a cable tie that will be easier to handle when suited up with radiation protective clothing Further objects and advantages of my invention will become apparent from the consideration of the drawings and ensuing description.

DRAWINGS FIGURES

FIG. 1 is a perspective view of a flotation device;

FIG. 2 is a longitudinal section through on embodiment of a cable tie and flotation device when fully assembled;

FIG. 3 is a plan view of said cable tie and said float when fully assembled.

REFERENCE NUMERALS

10-Flotation device
11-Inner opening of the flotation device
12-Outer surface of the flotation device
13-Cable tie
14-Cable tie head
15-Cable tie tip
16-Cable tie elongated strap Summary Not Needed
Description of Invention A typical embodiment of the cable tie flotation device is illustrated in a perspective view in FIG. 1.

In FIG. 1 a cable tie flotation device 10 is illustrated. In the embodiment illustrated in FIG. 1, said cable tie flotation device 10 has a inner opening 11 and a outer surface 12. In the preferred embodiment said cable tie flotation device 10 is a flexible rubber-like closed cell sponge such as Ethylene-Propylene-Dyene-Monomer or more commonly known as EPDM closed cell sponge. This particular type is Royalene 4243 available from Universal Rubber Company in Dawsonville GA, EPDM is only one of several materials that could be used as the cable tie flotation device 10. Other closed cell sponge materials such as silicone, polyethylene, polypropylene, rubber, foams, etc. could also be used along with any other material that can provide buoyancy to the cable tie while remaining flexible enough not to impede with the intended use of the cable tie.

Referring specifically to FIGS. 2 and 3 of the drawings, there is shown one embodiment of a cable tie 13 with a flotation device 10 assembled on said cable tie 13. By varying said inner opening 11, and said outer surface 12, and the overall length of the cable tie flotation device 10, allows for the cable tie flotation device 10 to conform to a vast array of sizes, materials, and varying weights that cable tie 13 is available in.

From the description above, a number of advantages of my cable tie flotation device becomes evident.

(a) To enable a cable tie to become buoyant when introduced into water so that if said cable tie should happen to break or become unfastened it will float to the water surface for easy retrieval.

(b) When accountability issues are a concern, the cable tie flotation device being made of a rubber like substance can be written on to allow the cable tie flotation device to also be used as an identification tag.

(c) The ability of the cable tie flotation device to be highly compactable so that when the flotation devices are discarded they take up minimal room in the radioactive waste storage containers.

(d) The cable tie flotation device being made of a rubber like substance will easily conform to the cable tie and mating items that it is required to secure, without impeding the cable ties usefulness.

(e) To allow the cable tie flotation device to be highly visible and allow for color coding by adding brilliant colors during the manufacturing process at a very low cost.

(f) Extruding the cable tie flotation device allows for a very cost effective way for manufacturing. By having the cable tie flotation device in the extruded form it also allows very quick assembly, thus reducing labor costs.

(g) When wearing radiation protective clothing it becomes extremely difficult to handle small objects such as cable ties. The larger cross section of the flotation device makes handling of cable ties less difficult.

Operation

To assemble a flotation device 10, on to a cable tie 13 one would first squeeze the outer diameter 12 of the flotation device 10 by using your hand. Once the inner opening 11 somewhat flattens, start to slide the cable tie tip 15 through the inner opening 11 of the flotation device 10. Once the cable tie tip 15 protrudes through the other end of the inner opening 11 one can grab the cable tie tip 15 and pull the cable tie elongated strap 16 while pushing the flotation device 10 at the same time. Once the flotation device 10 touches the cable tie head 14 the pulling and pushing of the cable tie elongated strap 16 and the flotation device 10 respectively can stop. Next release the squeezing action on the outer surface 12 of the flotation device 10 by removing your hand. At this point the flotation device 10 attempts to go back to its original form. In doing so the inner surface 11 is obstructed by the cable tie elongated strap 16 consequently providing a tight fit. This tight fit will prevent the cable tie 13 from becoming disassembled from the flotation device 10. The flotation device 10 being made of a rubber like substance can conform to many mating parts with which the cable tie 13 is being used to secure.

With a flotation device 10 assembled on a cable tie 13, the cable tie 13 will now become buoyant. Should the cable tie 13 snap, break or unfasten and end up in water it will float allowing for easy retrieval. In areas such as a reactor vessel, reactor cavity, refuel pool or any other area where it would be undesirable for a cable tie to sink.

With the flotation device 10 available in brilliant colors, to make the pair highly visible, the cable tie 13 and flotation device 10 can be easily seen and scooped from the water surface and then discarded.

Summary, ramifications, and Scope of Invention

Accordingly, a reader will see that the flotation device is used as a safeguard for cable ties that may fall into the reactor cavity, refueling pool, reactor vessel, etc. inadvertently or by unfastening, breaking, snapping etc. while in use. As shown in the drawing(s) and described in the static and operational description of a flotation device, it provides a simple and easy way for assembling the flotation device on to a cable tie while being very cost effective.

More importantly by using the flotation device it can save radiation exposure to plant workers and save thousands of dollars during the engineering evaluation, search, and retrieval of cable ties in water.

Furthermore a flotation device has the additional advantages in that

It permits different coloring additives to said flotation device to make them highly visible.

It permits different coloring additives to said flotation device for color coding.

It allows the outer diameter surface to said flotation device to be labeled for identification and accountability issues It allows for a very compliant surface so that it will not impede in the usefulness the cable tie It allows for uses either above or in the water It allows the material to be highly compact able for radioactive waste storage.

Its larger cross section allows for easier handling of the tie strap when wearing protective clothing Although the description above contains many specifications these should not be construed as limiting the scope of the invention but as merely providing illustrations of the presently preferred embodiments of this invention. For example the flotation device can have other shapes, such as oval, trapezoidal, triangular, square etc. Other embodiments could also be used such as a flotation device that is in the molded form that could straddle the cable tie. Other materials for the flotation device which have a specific gravity of less than one could be used. Air entrapment into the cable tie itself could also be used. Assembly of the flotation device to the cable tie can be in other forms than discussed, such as straddled over the cable tie, tied to the cable tie, glued to the cable tie, mechanically fastened to the cable tie, or molded into the cable tie etc.

Thus the scope of the invention should be determined by the appended claims and their legal equivalents, rather than by example given.

I claim:

1. A cable tie flotation device for making a cable tie buoyant, said device comprising:

a volume of resilient, deformable material having an opening therethrough, said material having a specific gravity less than one; and fastening means comprising an opposed resilient force created by the deformation of said opening by a cable tie passing therethrough such that said deformable material is maintained in connective relationship about said cable tie by said opposed resilient force of said material.

2. The device as claimed in claim 1 wherein said deformable material is a closed-cell sponge material.

3. The device as claimed in claim 2 wherein said closed-cell sponge material is made of silicone, polyethylene, polypropylene, or rubber.

4. The device as claimed in claim 2 wherein said closed-cell sponge material comprises a mixture of one or more from the group consisting of silicone, polyethylene, polypropylene, or rubber.

5. The device as claimed in claim 1 wherein said deformable material is ethylene-propylene-dyene monomer.

6. The device as claimed in claim 1 wherein said opening has a diameter smaller than said cable tie.

7. The device as claimed in claim 1 wherein said volume is sufficient to keep said cable tie afloat in a liquid.

8. The device as claimed in claim 1 wherein said volume is cylindrical.

9. A floatable cable tie comprising:

a cable tie having a strap portion and a head portion at one end of said strap portion; and a volume of resilient, easily-deformable buoyant material having an opening therethrough and a fastening means comprising an opposed resilient force created by the deformation of said opening by a cable tie passing therethrough such that said deformable material is maintained in connective relationship about said cable tie by said opposed resilient force of said material, wherein said volume of said buoyant material is sufficient to keep said cable tie afloat in a liquid.

10. The floatable cable tie as claimed in claim 9 wherein said buoyant material has a specific gravity less than one.

11. The floatable cable tie as claimed in claim 9 wherein said buoyant material is a closed-cell sponge material.

12. The floatable cable tie as claimed in claim 11 wherein said closed-cell sponge material is made of silicone, polyethylene, polypropylene, or rubber.

13. The floatable cable tie as claimed in claim 11 wherein said closed-cell sponge material comprises a mixture of one or more from the group consisting of silicone, polyethylene, polypropylene, or rubber.

14. The floatable cable tie as claimed in claim 9 wherein said buoyant material is ethylene propylene dyene monomer.

15. A method of providing buoyant support to a cable tie comprising:

squeezing a resilient, deformable cable tie flotation device to deform an opening therethrough sufficiently to allow insertion of a cable tie having a head portion acid a strap portion, said opening having a diameter slightly smaller that the diameter of said cable tie strap portion;

inserting said strap portion end of said cable tie into said opening of said deformed flotation device;

sliding said deformed flotation device along said cable tie strap until said flotation device is adjacent to said head portion of said cable tie; and releasing said deformed flotation device and allowing an opposed resilient force created by said squeezing of said flotation device to act upon said strap portion of said cable tie securing said flotation device to said cable tie.

16. The method as claimed in claim 15 wherein said deformable flotation device is made of a closed-cell sponge material.

17. The method as claimed in claim 16 wherein said closed-cell sponge material is silicone, polyethylene, polypropylene, or rubber.

18. The method as claimed in claim 16 wherein said closed-cell sponge material comprises a mixture of one or more from the group consisting of silicone, polyethylene, polypropylene, or rubber.

19. The method as claimed in claim 15 wherein said flotation device is made of ethylene-propylene-dyene monomer.

20. The method as claimed in claim 15 wherein said flotation device is markable.

* * * * *